(12) United States Patent
White et al.

(10) Patent No.: US 9,924,747 B2
(45) Date of Patent: *Mar. 27, 2018

(54) APPAREL INCLUDING INTERCONNECTED WICKING STRUCTURE

(71) Applicant: Under Armour, Inc., Baltimore, MD (US)

(72) Inventors: Thomas White, Ruxton, MD (US); Mark Cumiskey, Ellicott City, MD (US)

(73) Assignee: Under Armour, Inc., Baltimore, MD (US)

( * ) Notice: Subject to any disclaimer, the term of this patent is extended or adjusted under 35 U.S.C. 154(b) by 389 days.

This patent is subject to a terminal disclaimer.

(21) Appl. No.: 14/610,026

(22) Filed: Jan. 30, 2015

(65) Prior Publication Data

US 2015/0135396 A1 May 21, 2015

Related U.S. Application Data

(63) Continuation of application No. 14/262,966, filed on Apr. 28, 2014, now Pat. No. 9,364,032, which is a
(Continued)

(51) Int. Cl.
*A41D 13/00* (2006.01)
*A41D 1/00* (2018.01)
(Continued)

(52) U.S. Cl.
CPC .............. *A41D 1/00* (2013.01); *A41D 13/002* (2013.01); *A41D 13/0015* (2013.01); *B32B 5/26* (2013.01); *A41D 31/0011* (2013.01); *A41D 2400/20* (2013.01); *B32B 2250/20* (2013.01); *B32B 2262/0261* (2013.01); *B32B 2262/0276* (2013.01); *B32B 2262/062* (2013.01); *B32B 2307/728* (2013.01);
(Continued)

(58) Field of Classification Search
CPC .... A41D 13/0015; A41D 1/04; A41D 13/018; B64D 10/00; B32B 27/12; B32B 5/18; E04D 7/005; B44C 1/1712; A62B 17/003; A41B 13/06
USPC ..... 2/69, 81, 69.5, 102, 2.14, 456; 428/36.1, 428/36.5, 145, 201
See application file for complete search history.

(56) References Cited

U.S. PATENT DOCUMENTS 4,130,902 A 12/1978 Mackenroth et al.
4,676,784 A 6/1987 Erdman et al.
(Continued)

FOREIGN PATENT DOCUMENTS

GB 2329103 A 3/1999

*Primary Examiner* — Tejash Patel

(57) ABSTRACT

A fabric is provided having a defined pattern of hydrophobic and hydrophilic regions that extend entirely through the thickness of the fabric so that the defined pattern is identical on the inner and outer surfaces of the fabric. The defined pattern is configured so that the hydrophilic regions are all in communication or interconnected so that moisture, such as perspiration, can wick not only from the inner to the outer surface of the fabric but also throughout the surface of the fabric and in several directions on the fabric so that the surface area of the wetted hydrophilic regions increases. The defined pattern may be further configured so that none of the hydrophobic regions are in communication.

20 Claims, 1 Drawing Sheet

Related U.S. Application Data continuation of application No. 13/655,531, filed on Oct. 19, 2012, now Pat. No. 8,806,663.

(51) Int. Cl.
*A41D 13/002* (2006.01)
*B32B 5/26* (2006.01)
*A41D 31/00* (2006.01)

(52) U.S. Cl.
CPC ... *B32B 2307/7265* (2013.01); *B32B 2307/73* (2013.01); *B32B 2437/00* (2013.01); *Y10T 428/2481* (2015.01); *Y10T 428/249921* (2015.04); *Y10T 442/2164* (2015.04); *Y10T 442/2484* (2015.04)

(56) References Cited

U.S. PATENT DOCUMENTS

| | | | |
|---|---|---|---|
| 5,267,519 A | 12/1993 | Uglene et al. | |
| 5,423,087 A * | 6/1995 | Krent | A41D 13/0156 2/267 |
| 5,826,308 A | 10/1998 | Chang | |
| 6,521,813 B1 | 2/2003 | Chihani | |
| 6,716,498 B2 | 4/2004 | Curro et al. | |
| 6,759,354 B1 | 7/2004 | Smith et al. | |
| 7,008,887 B2 | 3/2006 | Rearick et al. | |
| 7,678,718 B2 | 3/2010 | Harris et al. | |
| 7,842,625 B1 | 11/2010 | Stockton et al. | |
| 7,891,026 B1 | 2/2011 | Smith | |
| 8,806,663 B2 | 8/2014 | White et al. | |
| 2005/0050619 A1* | 3/2005 | Dunn | A41D 31/0027 2/458 |
| 2009/0255031 A1* | 10/2009 | McIntosh | A41D 3/02 2/87 |
| 2012/0052266 A1* | 3/2012 | Tee | A41D 31/02 428/206 |
| 2014/0106138 A1 | 4/2014 | Chung et al. | |
| 2014/0288515 A1 | 9/2014 | Pan et al. | |
| 2015/0210032 A1* | 7/2015 | Blackford | B32B 3/10 428/196 |

\* cited by examiner

APPAREL INCLUDING INTERCONNECTED WICKING STRUCTURE

CROSS REFERENCE TO RELATED APPLICATIONS

The present invention claims priority to U.S. nonprovisional application Ser. No. 14/262,966, entitled "Fabric Having Improved Diffusion Moisture Capability and Garments made Therefrom" and filed 28 Apr. 2014, which claims priority to U.S. nonprovisional application Ser. No. 13/655,531 entitled "Fabric Having Improved Diffusion Moisture Capability and Garments made Therefrom" and filed 19 Oct. 2012. The disclosure of each aforementioned application is incorporated herein by reference in its entirety.

FIELD OF THE INVENTION

The present disclosure relates in general to a fabric for garments for wicking sweat or moisture away from the skin of the wearer for evaporation at the outer surface of the garment.

BACKGROUND OF THE INVENTION

Active wear apparel or apparel designed to be worn in hot, humid environments are generally characterized as well suited to be worn during times when one is likely to be perspiring. Optimally, the active wear garment should have some moisture management capability, while still remaining comfortable, providing freedom of movement and being easy to care for. One of the prime factors for garment comfort when perspiring heavily is how well the garment transfers moisture away from the skin. Additionally, for greater comfort after periods of heavy perspiration, the garment should optimally feel dry next to the skin or inner garments.

Garments made from cotton fabric and other natural material fabrics (such as linen, wool, etc.) are generally absorbent, and continue to feel comfortable under conditions of very light perspiration. This is because the fabric absorbs the relatively small amount of moisture produced at these times, keeping the wearer feeling dry. However, under conditions of heavier perspiration, these fabrics feel wet, heavy and clingy, restricting movement and becoming uncomfortable to wear. Additionally, once these fabrics become wet, they take a long time to dry, and continue to feel damp and uncomfortable until they have fully dried. This dampness can have other undesirable effects on the wearer as well. For example, wet fabrics are known to have increased friction against skin. This dramatically increases the chafing and even blistering resulting from movement, commonly suffered during athletic activity. Also, a damp fabric tends to chill the wearer, once physical activity is stopped, through excessive evaporative cooling. This is most prominent when the dampness is in direct contact with the skin.

Fabrics made from untreated polyester, nylon and other synthetic materials do not readily absorb moisture, due to being hydrophobic. As a result, when untreated synthetic fabrics are worn under conditions of even moderate perspiration, moisture tends to build up on the skin, because the fabric does not absorb moisture. Thus, when wearing untreated garments made of synthetic fibers, water tends to bead up and become trapped on the inner surface of the garment, resulting in an extremely uncomfortable garment.

A variety of methods have been used to improve the moisture transfer characteristics of certain fabrics. One common method is to apply a hydrophilic finish to a hydrophobic fabric made from synthetic fibers, rendering it a wicking fabric. A second method of improving moisture transfer is to use various fabric construction techniques to create fabrics that are more hydrophobic on one surface and more hydrophilic on the other surface, leading to moisture transfer from the hydrophobic side to the hydrophilic side. A third method has been developed for cotton by treating one side of the fabric with a discontinuous hydrophobic coating, leaving untreated areas as "wicking channels" in the fabric, such as the method described in U.S. Pat. No. 7,008,887. In this case, the cellulosic fabric (which is naturally hydrophilic) is treated on the inside with a hydrophobic finish (such as a fluoropolymer, silicone, or waxy polymer). The finish is applied in a discontinuous pattern, such that "wicking channels" (i.e., untreated regions of fabric) are formed. Moisture is absorbed into the untreated wicking channel regions and then wicks to the other areas of the garment to enhance evaporation. However, wicking channels will remain wet and in contact with the skin, which is uncomfortable to the wearer.

A need remains for fabrics having improved moisture transfer capability, particularly for active wear where the garment can otherwise become soaked with sweat.

BRIEF SUMMARY OF THE INVENTION

A fabric is provided having a defined pattern of hydrophobic and hydrophilic regions. The hydrophobic and hydrophilic regions extend entirely through the thickness of the fabric so that the defined pattern is identical on the inner and outer surfaces of the fabric. The defined pattern is configured so that the hydrophilic regions are all in communication or interconnected so that moisture, such as perspiration, can wick not only from the inner to the outer surface of the fabric but also throughout the surface of the fabric and in several directions on the fabric so that the surface area of the wetted hydrophilic regions increases. The defined pattern may be further configured so that none of the hydrophobic regions are in communication. In one aspect, the hydrophobic regions occupy over half and preferably about 60% of the surface area of the fabric. In one embodiment, a naturally hydrophilic fabric, such as cotton, is treated with a hydrophobic composition, with the composition applied in the defined pattern. In another embodiment, a naturally hydrophobic fabric, such as certain untreated synthetic fabrics, is treated with a hydrophilic composition applied in the defined pattern.

DETAILED DESCRIPTION OF THE INVENTION

Figure 1:
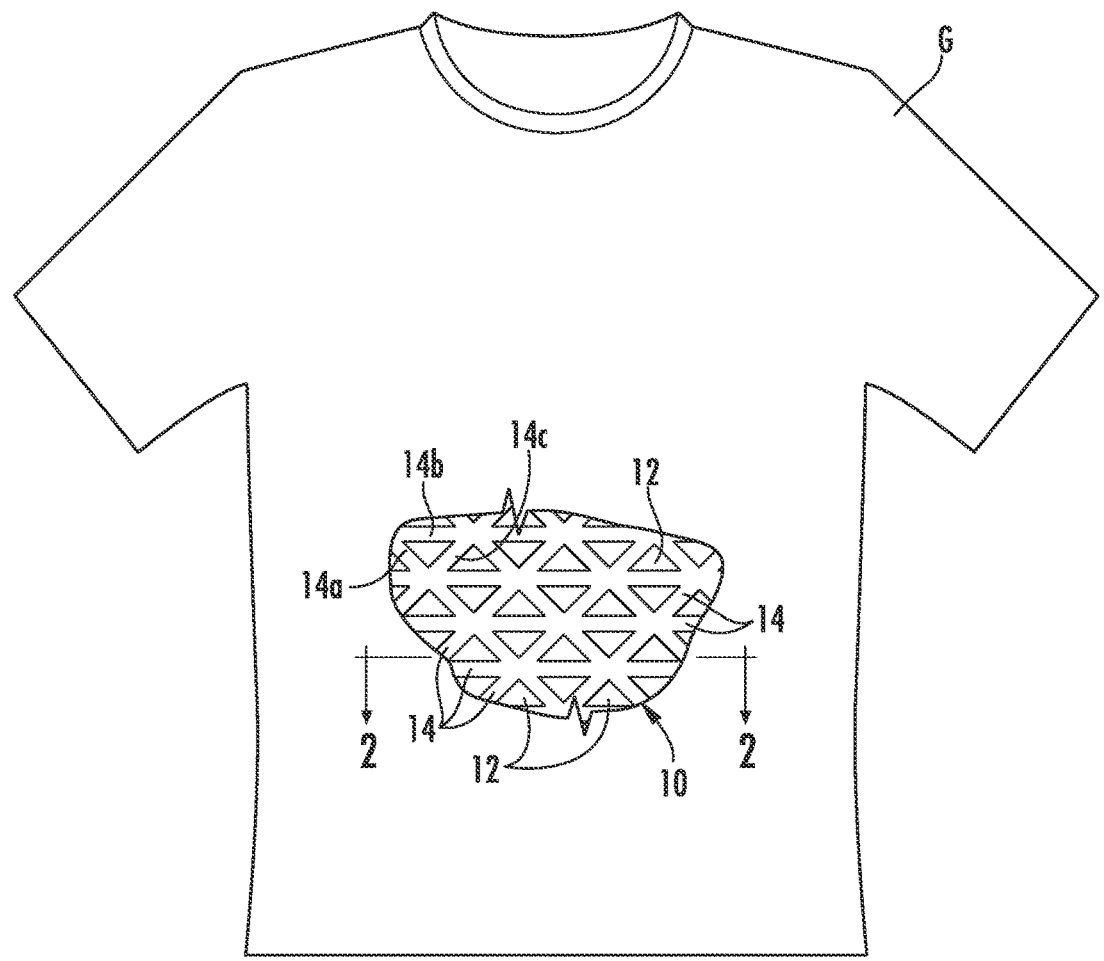
FIG. 1 is a plan view of a garment with the fabric disclosed herein, with the defined pattern of hydrophilic and hydrophobic regions displayed in an enlarged view.

For the purposes of promoting an understanding of the principles of the invention, reference will now be made to the embodiments illustrated in the drawings and described in the following written specification. It is understood that no limitation to the scope of the invention is thereby intended.

It is further understood that the present invention includes any alterations and modifications to the illustrated embodiments and includes further applications of the principles of the invention as would normally occur to one skilled in the art to which this invention pertains.

In one embodiment, a garment G may be an active wear shirt as depicted in FIG. 1. The garment G is formed of fabric, which may be a natural fabric, such as cotton or linen, or a synthetic fabric, such as polyester, nylon or rayon, although it is understood that garment may be made of any fabric appropriate to the particular garment. The garment is treated with a composition in a pre-defined continuous pattern 10. The treatment produces relatively hydrophobic regions 12 and relatively hydrophilic regions 14. As used herein, the term "hydrophobic" means having an aversion to or a very limited ability to absorb water and/or perspiration/sweat, as more pertinent to active wear. The term "hydrophilic" means having a high affinity for or a high ability to absorb water and/or perspiration. For the fabric described herein, the two regions 12 and 14 have hydrophilic and hydrophobic characteristics relative to each other so that perspiration is drawn to the hydrophilic regions 14 over the hydrophobic regions 12 even if the so-identified hydrophobic regions have some ability to absorb water/perspiration.

The hydrophilic region 14 of the pattern 10 is sized so that over half, and preferably about 60%, of the surface area of the garment G is hydrophilic—i.e., absorbent to perspiration. In an important feature, the hydrophilic region 14 in the pattern is interconnected or in communication throughout the entire garment. Thus, in the illustrated embodiment, the hydrophobic region 12 consists of a series of triangular shapes isolated from each other, or more specifically surrounded by the hydrophilic region 14. The hydrophilic region is thus composed of three legs 14a, 14b, 14c that surround the triangular hydrophobic regions. The hydrophilic region 14 in the embodiment of FIG. 1 resembles a honeycomb structure. Although the pattern 10 is enlarged in FIG. 1, the pattern is preferably much smaller on the garment G so that the hydrophilic region 14 is always in contact with the skin of the wearer. In a specific embodiment, the hydrophobic region 12 is formed by equilateral triangles having sides with a length W1 (FIG. 2) of about 6 mm. The legs 14a, 14b, 14c have a width W2 of about 2 mm.

It is contemplated that other repeating patterns of hydrophilic and hydrophobic regions may be implemented in the fabric, provided that the hydrophilic regions are all interconnected or in fluid communication throughout the fabric or garment. Thus, rather than the hydrophobic regions 12 having a triangular shape, the regions could have some other repeatable geometric shape, such as a square, hexagon or circle. However, it has been found that the triangular shape provides an optimum ratio of hydrophobic to hydrophilic surface area, and more particularly a hydrophilic surface area that is about 60% of the total fabric surface area.

The fabric used to make the garment G can be formed of a variety of materials with a treatment to create the pre-defined pattern 10 of hydrophilic and hydrophobic regions. In one embodiment the fabric may be formed of a generally hydrophilic material, such as cotton or other similar material. For this fabric, a hydrophobic treatment is applied to the fabric in the pre-defined pattern. The hydrophobic treatment may be a composition that is generally hydrophobic and suitable for the use of the fabric, such as in a garment G. A suitable hydrophobic treatment may be a silicone composition, or other similar composition. In a specific embodiment the composition is the DS-9000 Eco Repel produced by Dow Corning.

The composition may be applied to the fabric using rotary printer or a flatbed screen printer technology, as is known in the art. The viscosity of the composition and the application technique are adapted for full penetration of the composition from the application surface to the opposite surface of the fabric. The manner in which the pattern 10 is applied depends upon the printing technique. Once applied the composition is cured by known means, such as by passing the treated fabric through an oven maintained at about 300° F. or other temperature suitable for the particular silicone or hydrophobic composition. The hydrophobic composition may be generally transparent upon curing and preferably does not alter the look and feel of the fabric between the treated (hydrophobic 12) and untreated (hydrophilic 14) regions of the pattern 10.

Alternatively, the fabric may be generally hydrophobic and the treatment may be with a hydrophilic composition. In this instance the pattern of application follows the pattern of the hydrophilic regions, so that the pattern of untreated fabric produces the hydrophobic regions.

Figure 2:
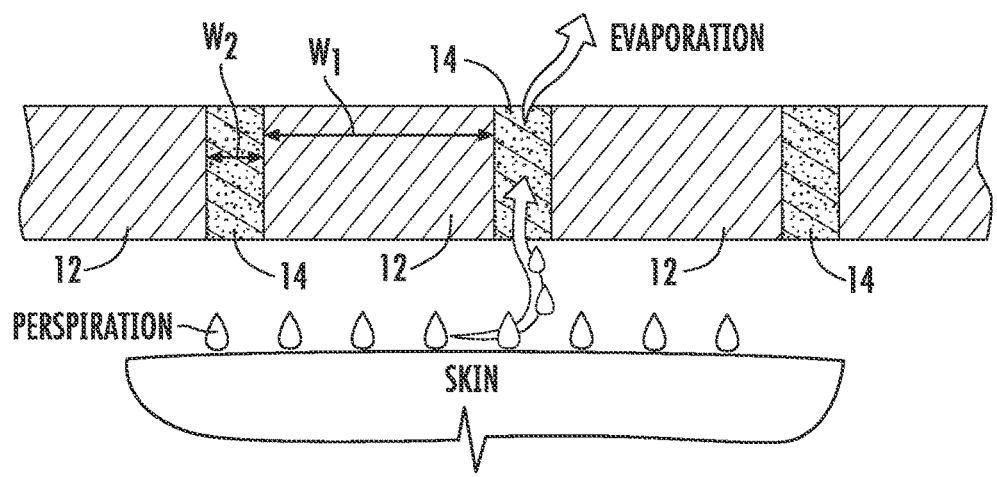
FIG. 2 is an enlarged cross-sectional view of the fabric shown in FIG. 1 and its relationship to the wearer's skin.

The hydrophilic regions 14 of the pattern 10 are adapted to wick moisture, such as perspiration, from the body of the wearer, as depicted in FIG. 2. The non-absorbent or hydrophobic regions will divert any moisture to the absorbent or hydrophilic regions of the pattern. Since the hydrophilic regions of the pattern are interconnected throughout the garment, any moisture will wick both through the thickness of the fabric and laterally through the fabric from the point of contact following the hydrophilic region of the pattern. Thus, for the pattern 10 shown in FIG. 1, the perspiration will gradually wick along the hydrophilic segments 14a-14c, thereby expanding the surface area of exposure of the perspiration soaked fabric. This increased surface area increases the exposure of the moisture to evaporate at the outer surface of the fabric, thereby shortening the drying time. It has also been found that providing the lateral wicking paths shortens the vertical wicking time, which is a measure of how quickly contacted moisture spreads across a garment. A shorter vertical wicking time also contributes to shortened drying time for a garment.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An article of apparel comprising:
   fabric defining a first surface and a second surface;
   a hydrophilic network incorporated into the fabric, wherein the hydrophilic network extends from the first fabric surface to the second fabric surface, and wherein the hydrophilic network wicks moisture along the network; and
   a plurality of hydrophobic regions disposed within the hydrophilic network, each of the of hydrophobic regions extending from the first fabric surface to the second fabric surface, wherein the plurality of hydrophobic regions divert moisture toward hydrophilic network.

2. The article of apparel according to claim 1, wherein the hydrophilic network simultaneously wicks moisture from the first fabric surface to the second fabric surface and wicks moisture laterally along the fabric.

3. The article of apparel according to claim 1, wherein the hydrophilic network is discontinuous along the fabric surfaces.

4. The article of apparel according to claim 1, wherein the hydrophilic network comprises a plurality of leg members in fluid communication with each other.

5. The article of apparel according to claim 4, wherein a hydrophobic region of the plurality of hydrophobic regions is surrounded by leg members of the hydrophilic network.

6. The article of apparel according to claim 4, wherein a first region of the plurality of hydrophobic regions is separated from a second region of the plurality of hydrophobic regions by a leg member of the plurality of legs comprising the hydrophilic network.

7. The article of apparel according to claim 1, wherein each of the plurality of hydrophobic regions define a polygon along each surface of the fabric.

8. The article of apparel according to claim 1, wherein:
the fabric is hydrophobic; and
the hydrophilic network comprises a penetrant composition that renders fabric hydrophilic.

9. The article of apparel according to claim 1, wherein:
the fabric is hydrophilic; and
the plurality of hydrophobic regions comprises a penetrant that renders the fabric hydrophobic.

10. The article of apparel according to claim 9, wherein the hydrophobic penetrant is a composition containing silicone.

11. The article of apparel according to claim 1, wherein the plurality of hydrophobic regions define a repeating geometric shape across each surface of the fabric.

12. The article of apparel according to claim 1, wherein the first surface is an inner, user facing surface and the second surface is an outer surface.

13. A method of forming an article of apparel comprising:
obtaining fabric possessing a first affinity for moisture, the fabric having a first surface and a second surface opposite the first surface;
applying a penetrant to the first surface of the fabric, wherein the penetrant is applied in a discontinuous pattern; and
curing the penetrant to form a plurality of regions within the fabric, the plurality of regions possessing a second affinity for moisture different from the first affinity.

14. The method of claim 13, wherein the penetrant is applied to the fabric such that the plurality of regions is a repeating pattern of regions.

15. The method of claim 13, wherein the penetrant regions define a repeating pattern of geometric shapes along the fabric.

16. The method of claim 15, wherein the geometric shapes are polygons.

17. The method of claim 13, wherein the first affinity for moisture is greater than the second affinity for moisture.

18. The method of claim 13, wherein the first affinity for moisture is less than the second affinity for moisture.

19. The method according to claim 13, wherein the first affinity is selected from the group consisting of hydrophilic and hydrophobic.

20. An article of apparel comprising:
fabric defining a first surface and a second surface;
a hydrophilic network incorporated into the fabric including a plurality of interconnected members, wherein:
the hydrophilic network extends from the first fabric surface to the second fabric surface, and
the plurality of interconnected members wicks moisture along the network; and
a plurality of hydrophobic regions disposed within the hydrophilic network, each of the hydrophobic regions extending from the first fabric surface to the second fabric surface, wherein the plurality of hydrophobic regions divert moisture toward hydrophilic network,
wherein a hydrophobic region of the plurality of hydrophobic regions is surrounded by interconnected members.

* * * * *